United States Patent
Sato et al.

(10) Patent No.: US 6,998,186 B2
(45) Date of Patent: Feb. 14, 2006

(54) FUEL CELL STACK

(75) Inventors: Shuji Sato, Utsunomiya (JP); Masahiro Ise, Utsunomiya (JP); Koji Okazaki, Shiki (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 246 days.

(21) Appl. No.: 10/445,348

(22) Filed: May 22, 2003

(65) Prior Publication Data
US 2005/0266286 A1    Dec. 1, 2005

(30) Foreign Application Priority Data
May 23, 2002    (JP)    ............................. 2002-149183

(51) Int. Cl.
*H01M 8/04* (2006.01)
*H01M 2/00* (2006.01)
*H01M 2/14* (2006.01)

(52) U.S. Cl. ........................... 429/26; 429/20; 429/34; 429/38; 429/39

(58) Field of Classification Search ................. 429/26, 429/20, 34, 38, 39
See application file for complete search history.

(56) References Cited

U.S. PATENT DOCUMENTS

| | | | | |
|---|---|---|---|---|
| 6,080,502 A | * | 6/2000 | Nolscher et al. ............... | 429/34 |
| 6,087,033 A | * | 7/2000 | Grune et al. ................... | 429/37 |
| 6,703,155 B1 | * | 3/2004 | Scartozzi ....................... | 429/32 |
| 2001/0046618 A1 | * | 11/2001 | Okazaki et al. ................ | 429/26 |

* cited by examiner

*Primary Examiner*—Patrick Joseph Ryan
*Assistant Examiner*—Angela J. Martin
(74) *Attorney, Agent, or Firm*—Lahive & Cockfield, LLP; Anthony A. Laurentano, Esq.

(57) ABSTRACT

A fuel cell stack includes power generation cells, terminal plates, first cooling cells, and second cooling cells. The terminal plates are electrically connected to the power generation cells. The first cooling cells are interposed between the terminal plates, and a cooling liquid is supplied to the first cooling cells for cooling the power generation cells. The second cooling cells are interposed between the terminal plates. A predetermined number of power generation cells are interposed between the first cooling cell and the second cooling cell. A cooling air is supplied to the second cooling cell for cooing the power generation cells.

9 Claims, 14 Drawing Sheets

FUEL CELL STACK

BACKGROUND OF THE INVENTION

1. Field of the Invention

The present invention relates to a fuel cell stack of power generation cells formed by stacking a plurality of electrolyte electrode assemblies and separators alternately. Each of the electrolyte electrode assemblies includes an anode, a cathode, and an electrolyte interposed between the anode and the cathode. A fuel gas is supplied to the anode, and an oxygen-containing gas is supplied to the cathode for generating electricity in the power generation cells.

2. Description of the Related Art

For example, a phosphoric acid fuel cell (PAFC) is a power generation cell which employs a porous electrolyte layer of silicon carbide matrix for retaining concentrated phosphoric acid. The electrolyte layer is interposed between carbon-based electrodes (anode and cathode) to form an electrolyte electrode assembly. The electrolyte electrode assembly is interposed between separators (bipolar plates). The electrolyte electrode assembly and the separators make up a unit of the power generation cell for generating electricity. A predetermined number of the power generation cells are stacked together to form the fuel cell stack.

Another type of the power generation cell is a solid polymer electrolyte fuel cell which employs a membrane electrode assembly (MEA) including a polymer ion exchange membrane (proton exchange membrane). Similarly, the membrane electrode assembly and the separators make up a unit of the power generation cell. A predetermined number of the power generation cells are stacked together to form the fuel cell stack.

In the fuel cell stacks, a fuel gas such as a hydrogen-containing gas is supplied to the anode. The catalyst of the anode induces a chemical reaction of the fuel gas to split the hydrogen molecule into hydrogen ions (protons) and electrons. The hydrogen ions move toward the cathode through the electrolyte, and the electrons flow through an external circuit to the cathode, creating a DC electric current. An oxygen-containing gas or air is supplied to the cathode. At the cathode, the hydrogen ions from the anode combine with the electrons and oxygen to produce water.

The fuel cell should be operated at around an optimum temperature for the performance of power generation. For example, the phosphoric acid fuel cell is operated in the temperature range of 120° C. to 200° C., and the solid polymer electrolyte fuel cell is operated in the temperature range of 60° C. to 90° C. In order to maintain the temperature of the power generation cells in the desirable temperature range, various cooling systems have been adopted. Typically, the power generation cells are cooled by supplying coolant such as water to a coolant passage formed in the separators of the fuel cells stack.

In the cooling system, coolant such as water or conventional cooling liquid for vehicles contains impurities such as ion, or metallic additives. Therefore, the coolant itself is conductive. Even if deionized water or pure water is used as the coolant, the coolant may be contaminated by metals, for example, and become conductive in circulating a coolant passage or a radiator during the operation of the cooling system.

While electrons produced by the electrochemical reactions in the power generation cells are collected from terminal plates at opposite ends of the fuel cell stack, the electrons may be leaked to the coolant passage or the radiator through the conductive coolant undesirably. Consequently, the power generation performance of the overall fuel cell stack is degraded due to energy losses caused by the leakages of electric current to the earth or liquid.

A solution to the problem proposed by the applicant of the present invention is discussed in the U.S. patent application publication No. U.S. 2001/0046618 A1. The publication discloses a fuel cell stack which effectively prevents the electric leakages through the coolant with a simple structure for maintaining a desirable power generation performance.

In the fuel cell stack, cooling cells are interposed between terminal plates for collecting electricity. Insulating means electrically insulates the coolant supplied into the cooling cell from the power generation cells and the terminal plates. Further, conducting means is used for electrical connection between the power generation cells, and electrical connection between the power generation cells and the terminal plates. With this structure, energy losses caused by electricity leakages to the earth or liquid is reliably prevented, and the desirable power generation performance of the overall fuel cell-stack is maintained.

In operating the fuel cell stack, heat is generated. The amount of heat depends on the operating condition of fuel cell stack. When the fuel cell stack is operated at high load, a large amount of heat is generated. In order to radiate heat generated in the operation of the fuel cell stack at the maximum load, the cooling system includes a relatively large heat exchanger.

For example, it is assumed that a fuel cell stack formed by stacking power generation cells are operated at a rated output of 70 kW. The power generation cells have a current density of 1 A/cm$^2$. The voltage applied between terminals of each power generation cell is approximately 0.6V. Under the condition, approximately 12% of the heat generated in the operation of the fuel cell stack is used to keep the temperature of the fuel cell stack, and used by radiation from the fuel cell stack. Therefore, the remaining approximately 88% of the heat needs to be absorbed by the coolant supplied into the fuel cell stack, or radiated from the externally positioned heat exchanger.

Consequently, a large pump is needed for circulating the coolant in the fuel cell stack, or the heat exchanger needs to be considerably large for radiating a large amount of heat.

SUMMARY OF THE INVENTION

A main object of the present invention is to provide a fuel cell stack having a simple and compact structure in which the temperature of surfaces of the power generation cells does not exceed an optimum temperature for operating the fuel cell stack even if the fuel cell stack is operated at a high output, and the power generation performance is maintained desirably.

According to the present invention, first cooling cells are interposed between terminal plates. A cooling liquid is supplied to the first cooling cell for cooling the power generation cells. Further, second cooling cells are interposed between the terminal plates. A predetermined number of power generation cells are interposed between the first cooling cell and the second cooling cell. A cooling gas is supplied to the second cooling cells for cooling the power generation cells.

A predetermined number of power generation cells are interposed between adjacent first cooling cells, or between the first cooling cell and the terminal plate. The temperature of the power generation cells near the first cooling cells is relatively low in comparison with the temperature of the power generation cells remote from the first cooling cells, i.e., the power generation cells centrally positioned between the fist cooling cells. The power generation cells centrally positioned between the first cooling cells tend to have a higher temperature.

In the present invention, each of the second cooling cells is provided at interval of a predetermined number of power generation cells from the first cooling cell. Stated otherwise, the second cooling cells are provided near the power generation cells having the higher temperature. A cooling gas is supplied to the second cooling cells for cooling the power generation cells having the high temperature near the second cooling cells. Therefore, the temperature of the power generation cells near the first cooling cells is controlled approximately at an optimum operating temperature, and the temperature of the power generation cells near the second cooling cells is decreased to the optimum operating temperature. Therefore, the temperature of all the power generation cells is controlled approximately at the optimum operating temperature. Thus, the temperature difference between the power generation cells stacked in the stacking direction is reduced, and it is possible to improve power generation performance of the power generation cells.

When the fuel cell stack is operated at a high output, both of the first cooling cells and the second cooling cells are used for cooling a desired number of power generation cells. Therefore, a large heat exchanger is not required for the fuel cell stack, and a small heat exchanger is used sufficiently.

In one embodiment, the second cooling cell is interposed between adjacent first cooling cells only. No second cooling cells are provided between the outermost first cooling cells at opposite ends in the stacking direction and the terminal plates. The number of power generation cells between the terminal plates and the outermost first cooling cell is smaller than the number of power generation cells between adjacent first cooling cells.

The second cooling cell is interposed centrally between adjacent first cooling cells. For example, if 2n pieces of power generation cells are interposed between adjacent first cooling cells, n pieces of power generation cells are interposed between the outermost first cooling cell and the terminal plate. Thus, the amount of heat removed (cooled) by the first cooling cell is small, and the temperature difference between the power generation cells is reduced in the stacking direction, and the number of the second cooling cells is reduced.

Further, in one embodiment, third cooling cells are provided outside the terminal plates. A coolant is supplied to the third cooling cells for cooling the power generation cells. The third cooling cells are positioned oppositely to the power generation cells. Therefore, the power generation cells are not cooled excessively, but cooled desirably. Thus, the temperature difference between the power generation cells is effectively reduced.

In one embodiment, the fuel cell stack is mounted on a vehicle, and has a cooling gas supply unit. The cooling gas supply unit keeps the temperature of the power generation cells at around the optimum operating temperature, and prevents the temperature difference between the power generation cells in the stacking direction. Therefore, the power generation performance is improved, and a high output is achieved easily.

In one embodiment, the cooling air supply unit utilizes a relative wind while the vehicle is moving for supplying the cooling gas to the second cooling cells. Auxiliary equipment such as a compressor for supplying the cooling gas to the second cooling cells is not needed. Thus, the cooling system is small, and the layout of the vehicle can be designed freely. It is possible to make a compact vehicle, and a large space is available in the vehicle.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
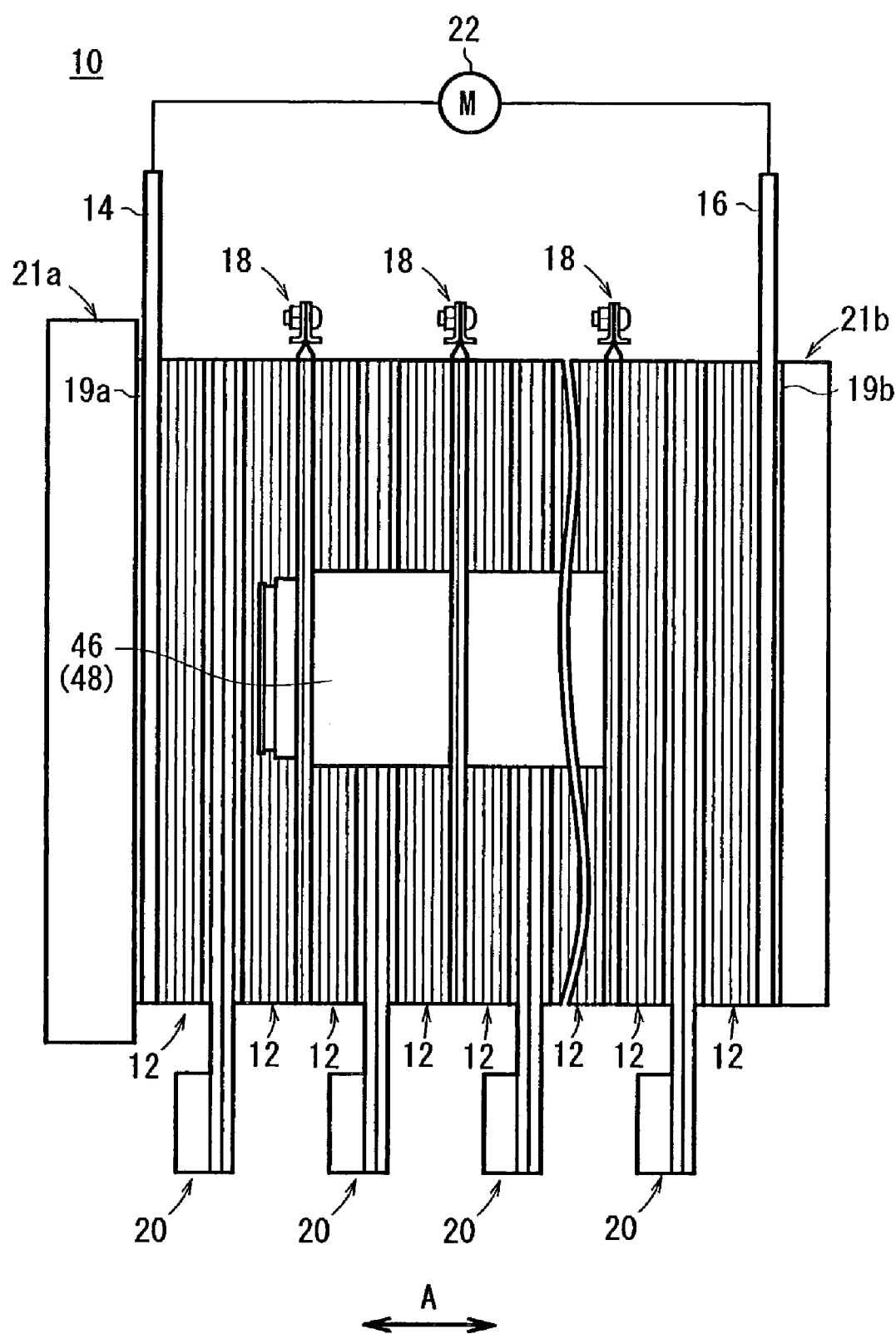
FIG. 1 is a side view schematically showing a fuel cell stack according to a first embodiment of the present invention.
Figure 2:
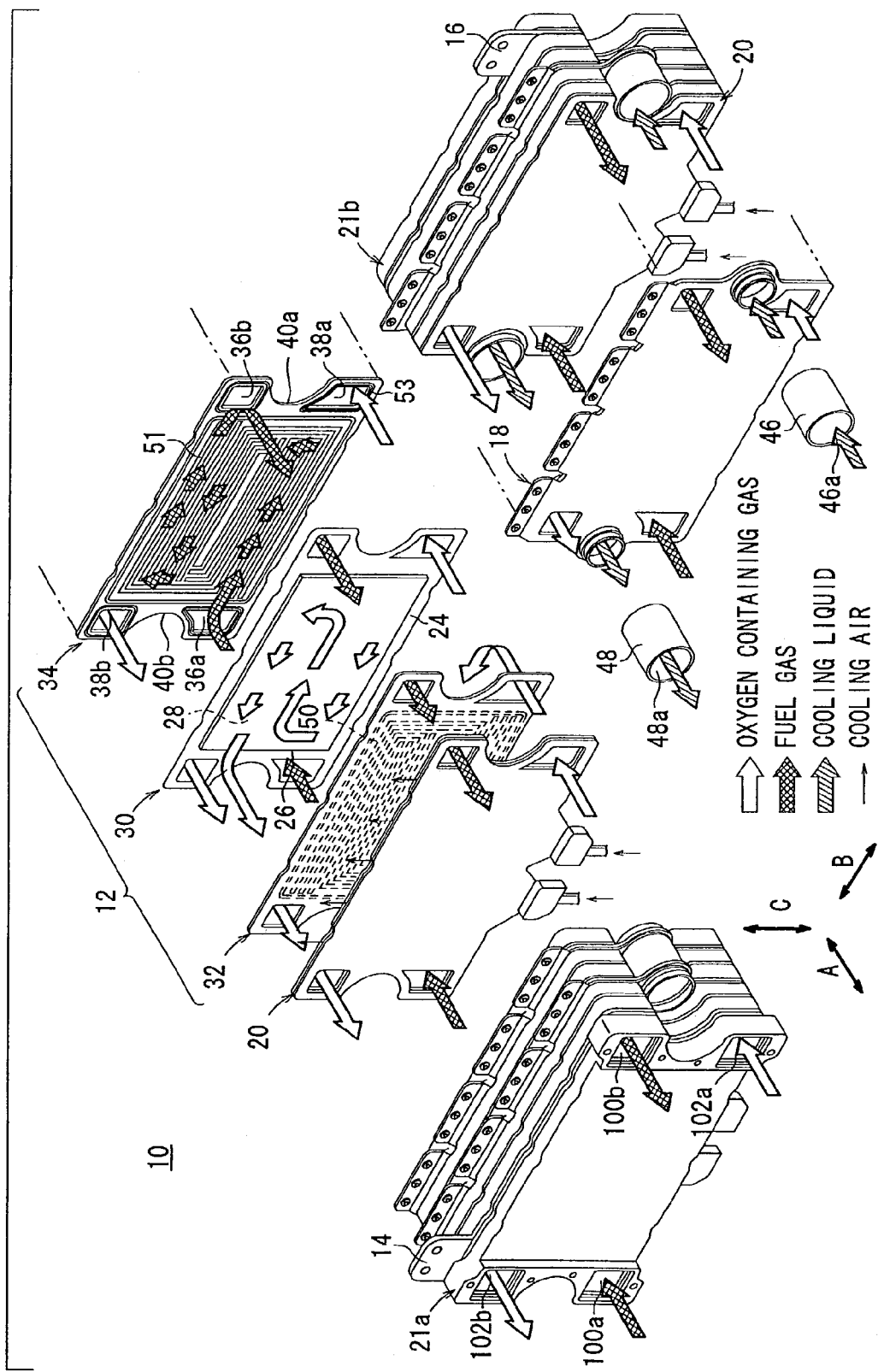
FIG. 2 is an exploded perspective view showing the fuel cell stack.
Figure 3:
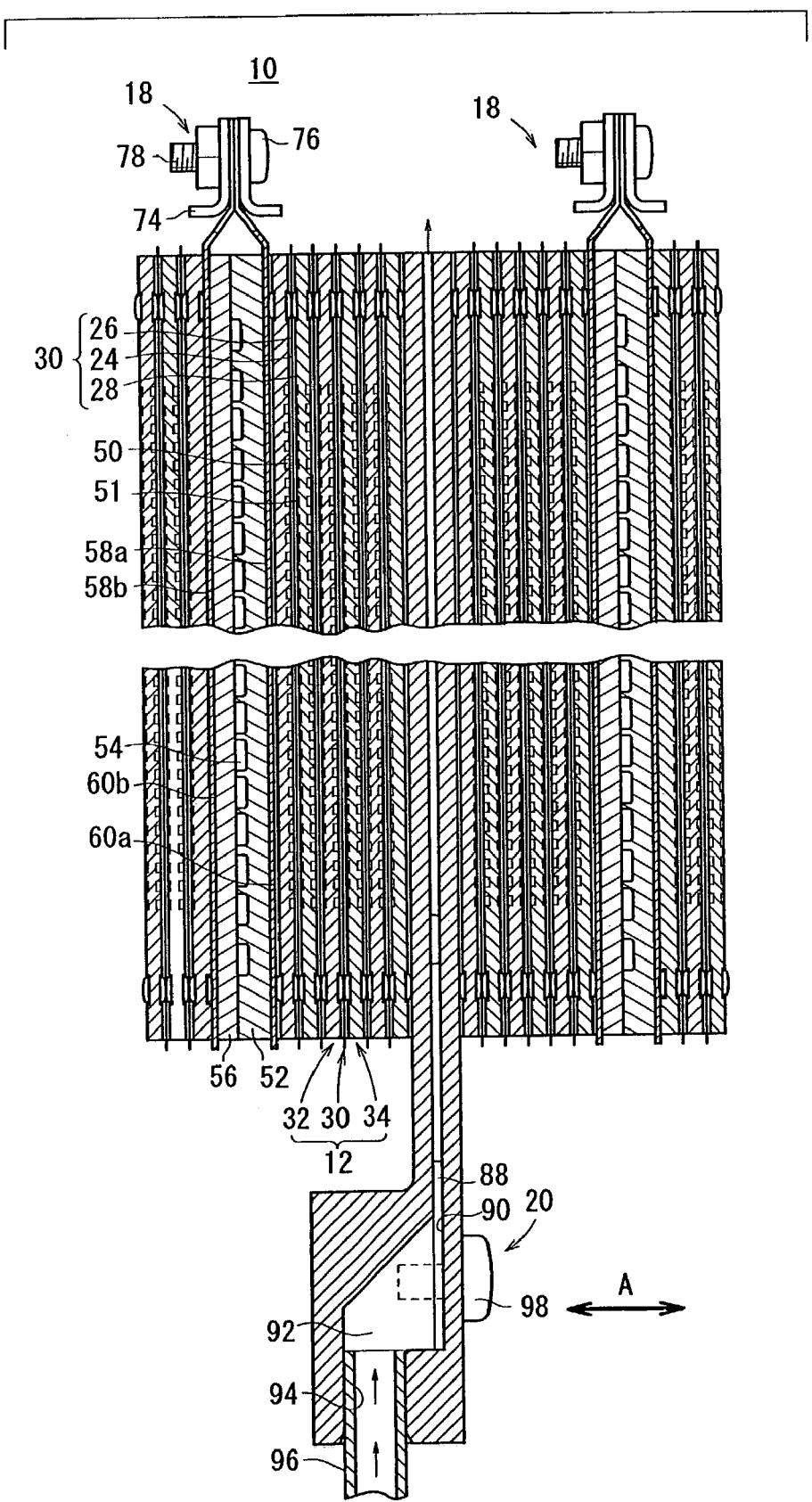
FIG. 3 is an enlarged view showing main components of the fuel cell stack.

FIG. 1 is a side view schematically showing a fuel cell stack 10 according to a first embodiment of the present invention. FIG. 2 is an exploded perspective view showing the fuel cell stack 10. FIG. 3 is an enlarged view showing main components of the fuel cell stack 10.

The fuel cell stack 10 is formed by stacking a predetermined number of power generation cells 12 in a stacking direction indicated by an arrow A.

Terminal plates 14, 16 are provided on the outside of outermost power generation cells 12 in the stacking direction. The terminal plates 14, 16 are connected to the power generation cells 12 electrically. A predetermined number of first cooling cells 18 and second cooling cells 20 are interposed between the terminal plates 14, 16. The first cooling cells 18 and the second cooling cells 20 are arranged alternately. A predetermined number of the power generation cells 12 are interposed between the first cooling cell 18 and the second cooling cell 20.

Insulator sheets 19a, 19b are provided on the outside the terminal plates 14, 16. Further, end plates 21a, 21b are provided on the outside of the insulator sheets 19a, 19b. End plates 21a, 21b are tightened by a tie rod or the like through a backup plate (not shown) for tightly connecting the power generation cells 12, terminal plates 14, 16, the first cooling cells 18, and the second cooling cells 20 in the direction indicated by the arrow A. A load 22 such as a motor is connected to the terminal plates 14, 16 (see FIG. 1).

As shown in FIGS. 2 and 3, the power generation cell 12 includes an electrolyte electrode assembly 30 made up of a cathode 26, and an anode 28, and an electrolyte unit 24 interposed between the cathode 26 and the anode 28. The electrolyte unit 24 includes an electrolyte layer and a frame member described later on. The electrolyte layer is formed by impregnating silicon carbide matrix or basic polymer such as polybenzimidazole with phosphoric acid. Each of the cathode 26 and anode 28 has a porous gas diffusion layer such as a porous carbon paper, and an electrode catalyst layer of platinum catalyst supported on carbon particles. The carbon particles are deposited uniformly on the surface of the gas diffusion layer. The electrode catalyst layer of the cathode 26, and the electrode catalyst layer of the anode 28 are fixed to the electrolyte unit 24, respectively.

The electrolyte electrode assembly 30 is interposed between a first separator 32 and a second separator 34 formed of a dense carbon material or metal. The electrolyte electrode assembly 30, and the first and second separators 32, 34 form a unit of the power generation cell 12.

At lower ends of the power generation cell 12 in a transverse direction indicated by an arrow B, a fuel gas supply passage 36a as a passage of a fuel gas such as a hydrogen-containing gas and an oxygen-containing gas supply passage 38a as a passage of an oxygen-containing gas are formed. Further, at upper ends of the power generation cell 12 in the transverse direction, a fuel gas discharge passage 36b as a passage of the fuel gas, and an oxygen-containing gas discharge passage 38b as a passage of the oxygen-containing gas are formed. The fuel gas supply passage 36a and the fuel gas discharge passage 36b are provided at diagonally opposite positions. The oxygen-containing gas supply passage 38a and the oxygen-containing gas discharge passage 38b are provided at diagonally opposite positions.

Cutouts 40a, 40b are formed at middle ends of the power generation cell 12 in the transverse direction. The cutouts 40a, 40b are provided for placing a coolant supply pipe 46 and a coolant discharge pipe 48, respectively. A cooling liquid supply passage 46a is formed in the coolant supply pipe 46, and a cooling liquid discharge passage 48a is formed in the coolant discharge pipe 48.

The first separator 32 has an oxygen-containing gas flow passage 50 on its surface facing the cathode 26 for supplying the oxygen-containing gas to the cathode 26. The oxygen-containing gas flow passage 50 is connected to the oxygen-containing gas supply passage 38a at one end, and connected to the oxygen-containing gas discharge passage 38b at the other end (see FIGS. 2 and 3). The second separator 34 has a fuel gas flow passage 51 on its surface facing the anode 28 for supplying the fuel gas to the anode 28. The fuel gas flow passage 51 is connected to the fuel gas supply passage 36a at one end, and connected to the fuel gas discharge passage 36b at the other end. Both of the oxygen-containing gas flow passage 50 and the fuel gas flow passage 51 comprise serpentine flow channels extending in the horizontal direction B, and guiding the oxygen-containing gas and the fuel gas upwardly.

Seal members 53 are provided on the surfaces of the first separator 32 and the second separator 34 facing the cathode 26 and the anode 28 by baking, for example, for sealing the fuel gas supply passage 36a, the oxygen-containing gas supply passage 38a, the fuel gas discharge passage 36b, and the oxygen-containing gas discharge passage 38b, the oxygen-containing gas flow passage 50, and the fuel gas flow passage 51 hermetically.

In FIG. 1, the first cooling cells 18 are arranged between the terminal plates 14, 16 at intervals of ten power generation cells 12. Stated otherwise, ten power generation cells are interposed between adjacent first cooling cells 18. As shown in FIGS. 2 and 3, the first and second separators 32, 34 disposed next to the first cooling cell 18 do not have any grooves as a gas passage on a surface facing the first cooling cell 18, and the gas passage is formed only on the other surface. The first and second separator 32, 34 disposed next to the second cooling cell 20 as described later on have the same structure. The other first and second separators 32, 34 have the gas passage on both surfaces, i.e., the oxygen-containing gas flow passage 50 on one surface, and the fuel gas flow passage 51 on the other surface.

Figure 4:
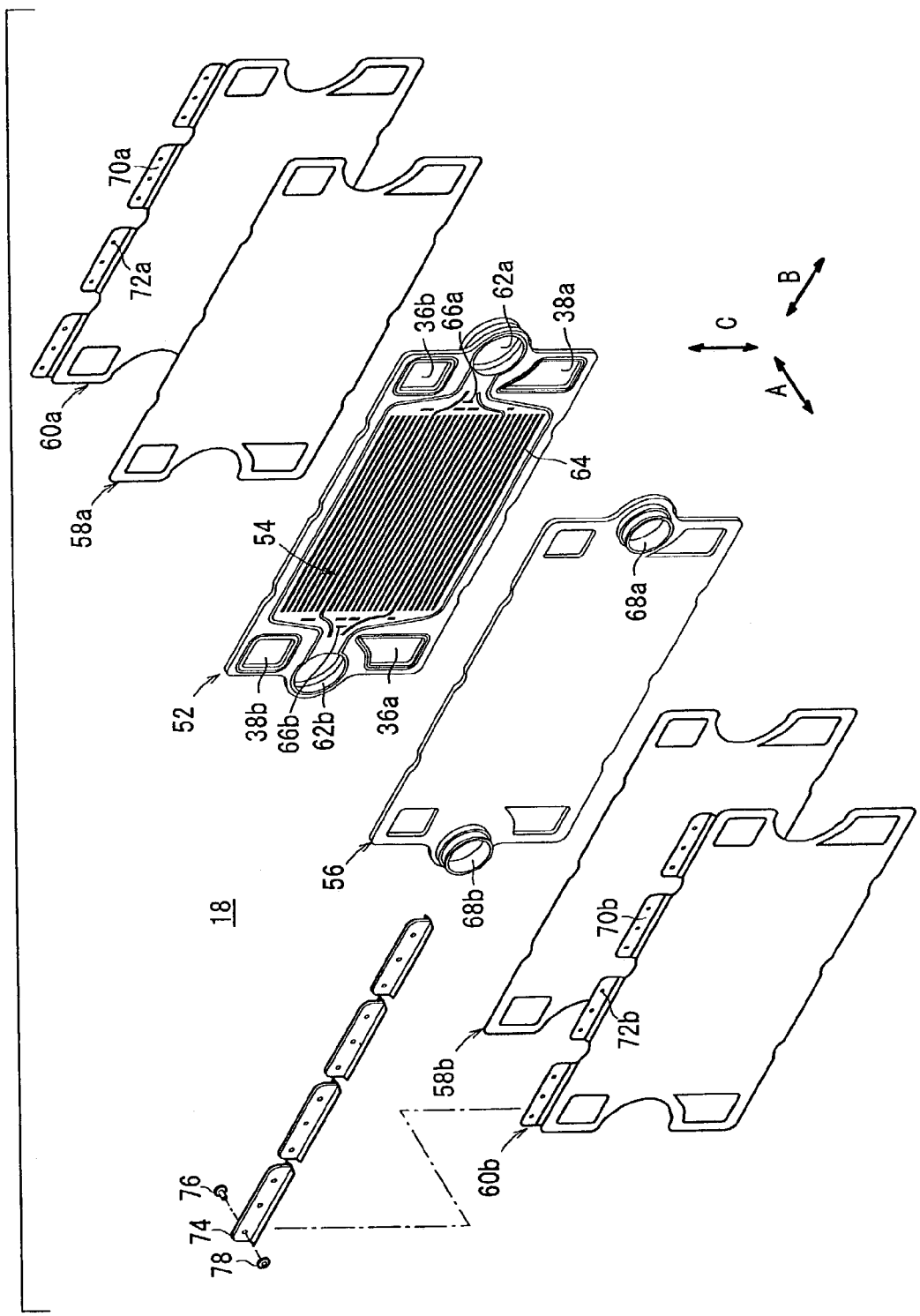
FIG. 4 is an exploded perspective view showing a first cooling cell of the fuel cell stack.

As shown in FIGS. 3 and 4, the first cooling cell 18 includes a cooling liquid passage plate 52, a cover plate 56 stacked on the passage plate 52 for forming a cooling liquid passage 54, and insulator sheets (insulators) 58a, 58b for electrically insulating a cooling liquid supplied to the cooling liquid passage 54 from the power generation cells 12 and the terminal plates 14, 16, and conductive plates 60a, 60b for electrically connecting the power generation cells 12 or the power generation cell 12 and the terminal plate 14, 16 outside the first cooling cell 18. The passage plate 52 and the cover plate 56 are formed of light alloy such as aluminum alloy or titanium alloy, or dense carbon material.

The passage plate 52 has cylindrical connectors 62a, 62b at middle ends in the transverse direction indicated by the arrow B. The cylindrical connectors 62a, 62b protrude from one surface of the passage plate 52. The coolant supply pipe 46 is connected to the connector 62a, and the coolant discharge pipe 48 is connected to the connector 62b. The cooling liquid passage 54 is formed on the other surface of the passage plate 52. The cooling liquid passage 54 comprises a plurality of grooves 64 extending linearly in the direction indicated by the arrow B. The grooves 64 are connected to the connectors 62a, 62b. A guide 66a is provided between an inlet of the grooves 64 and the connector 62a, and a guide 66b is provided between an outlet of the grooves 64 and the connector 62b for allowing the cooling liquid to uniformly and reliably flow through the grooves 64.

The cover plate 56 has cylindrical connectors 68a, 68b protruding outwardly from a surface opposite to the passage plate 52. The connectors 68a, 68b are provided in alignment with the connectors 62a, 62b, respectively. The connector 68a is connected to the coolant supply passage 46, and the connector 68b is connected to the coolant discharge passage 48.

Conductive plates 60a, 60b cover the passage plate 52 and the cover plate 56. An insulator sheet 58a is interposed between the conductive plate 60a and the passage plate 52. An insulator sheet 58b is interposed between the conductive plate 60b and the cover plate 56. Each of the conductive plates 60a, 60b is a metal plate having a high electrical conductivity such as copper alloy.

The insulator sheets 58a, 58b are formed of an insulator material such as polytetrafluoroethylene (PTFE), and attached to the entire surface of the conductive plates 60a, 60b using adhesive or the like. Alternatively, the conductive plates 60a, 60b may be coated using an insulator material such as silicon grease instead of using the insulator sheets 58a, 58b.

The conductive plates 60a, 60b have contact edges 70a, 70b folded together to contact with each other. A fixing member 74 covers the contact edges 70a, 70b. Screws 76 are inserted into the fixing member 74 and the holes 72a, 72b, and screwed into a nut 78 so that the passage plate 52 and the cover plate 56 are tightened between the conductive plates 60a, 60b.

As shown in FIG. 1, the second cooling cells 20 are arranged between adjacent first cooling cells 18, between the terminal plate 14 and the first cooling cell 18, and between the terminal plate 16 and the first cooling cell 18 at intervals of five power generation cells 12. Stated otherwise, the second cooling cells 20 are positioned centrally between adjacent first cooling cells 18, positioned centrally between the terminal plate 14 and the first cooling cell 18, positioned centrally between the terminal plate 16 and the first cooling cell 18. Five power generation cells 12 are interposed between the first cooling cell 18 and the second cooling cell 20, five power generation cells 12 are interposed between the terminal plate 14 and the second cooling cell 20, and five power generation cells are interposed between the terminal plate 16 and the second cooling cell 20.

Figure 5:
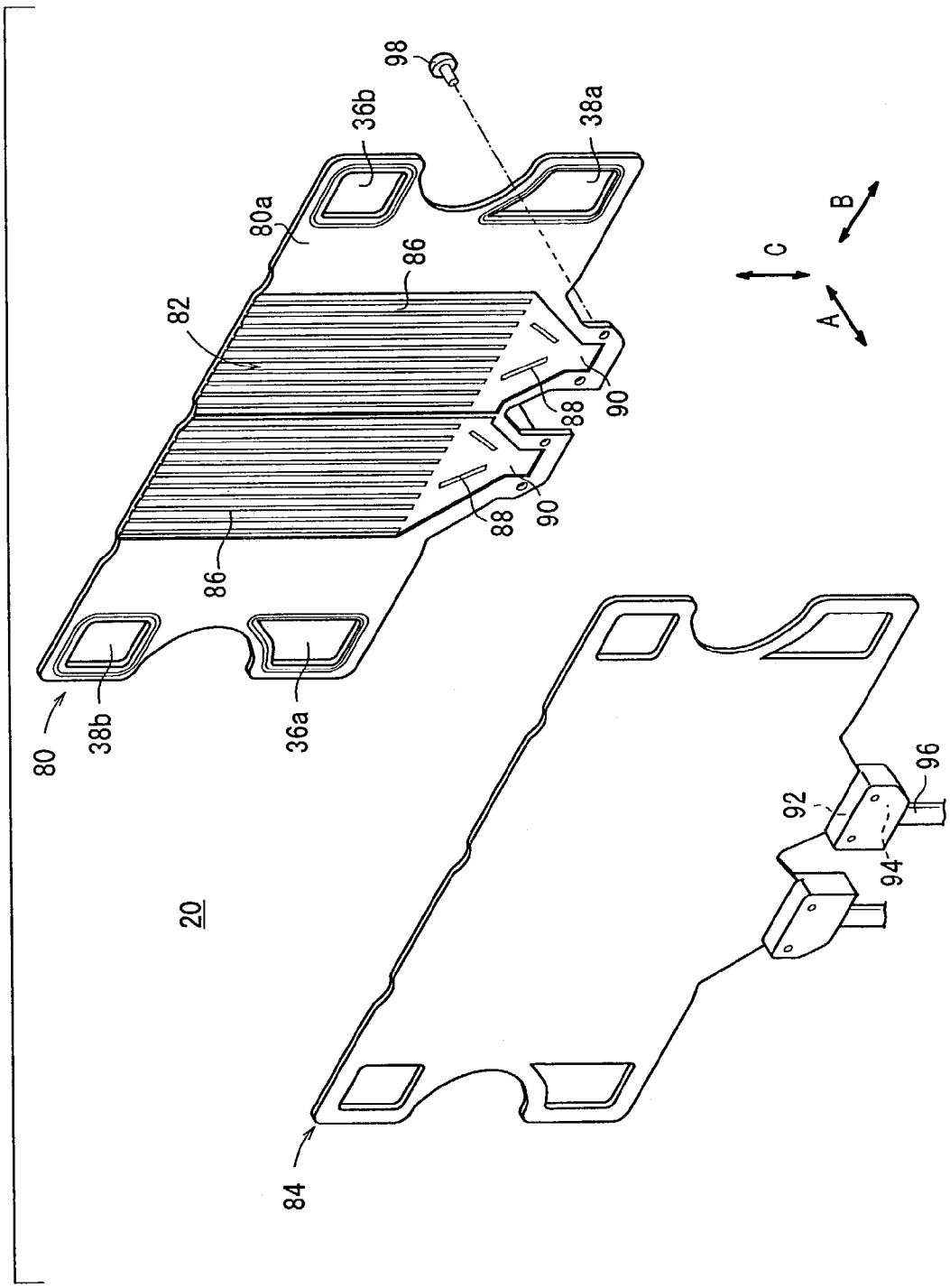
FIG. 5 is an exploded perspective view showing a second cooling cell of the fuel cell stack.

As shown in FIGS. 3 and 5, the second cooling cell 20 includes a cooling gas passage plate 80 as a passage of air, for example, and a cover plate 84 stacked on the passage plate 80 for forming a cooling air passage 82.

The passage plate 80 and the cover plate 84 are formed of a light material having a good thermal conductivity and a good electrical conductivity. For example, the passage plate 80 and the cover plate are formed of light alloy such as aluminum alloy or titanium alloy.

The cooling air passage 82 is formed on a surface 80a of the passage plate 80. The cooling air passage 82 comprises a plurality of grooves 86 extending vertically in the direction indicated by an arrow C. The grooves 86 are connected to air inlets 90 at their lower ends through guides 88. The cooling air passage 82 covers an area corresponding to 60% to 70% of the width (the dimension of the direction indicated by the arrow B) of the cathode 26 and the anode 28. The cover plate 84 has a chamber 92 for connection between the air inlet 90 and an air inlet port 94. The air inlet port 94 is connected to a pipe 96 which is electrically insulated. For example, the pipe 96 is formed of a resin such as polytetrafluoroethylene. Alternatively, the pipe 96 is a metal pipe, and the outer surface of the metal pipe is coated by a resin such as polytetrafluoroethylene. The passage plate 80 and the cover plate 84 are fixed together using a plurality of screws 98.

As shown in FIG. 2, the end plate 21a has a fuel gas inlet port 100a connected to the fuel gas supply passage 36a, a fuel gas outlet port 100b connected to the fuel gas discharge passage 36b, an oxygen-containing gas inlet port 102a connected to the oxygen-containing gas supply passage 38a, and an oxygen-containing gas outlet port 102b connected to the oxygen-containing gas discharge passage 38b.

Figure 6:
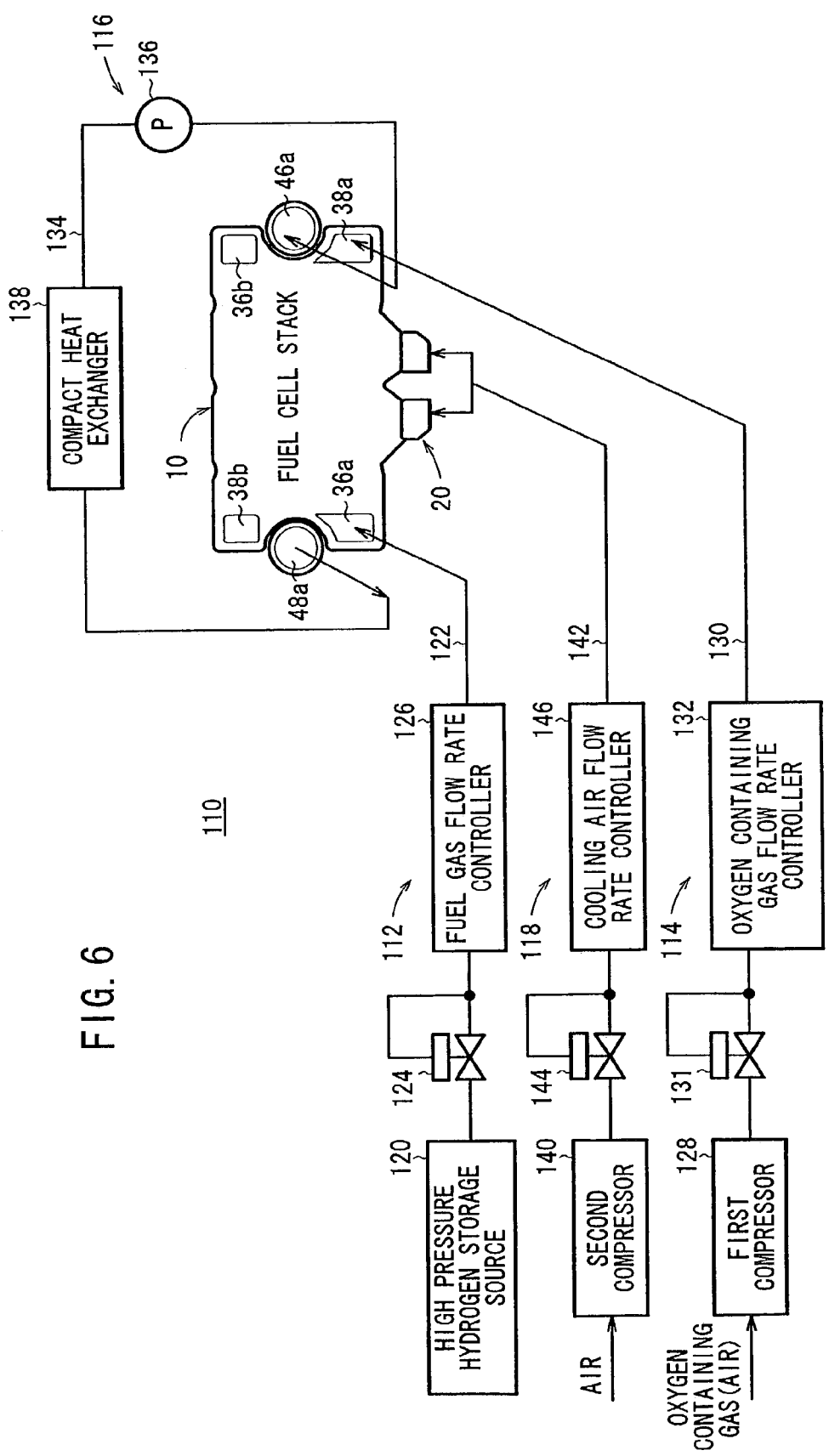
FIG. 6 is a view schematically showing a fuel cell system including the fuel cell stack.

FIG. 6 is a view schematically showing a fuel cell system 110 including the fuel cell stack 10 according to the first embodiment.

The fuel cell system 110 includes a fuel gas supply unit 112 for supplying a fuel gas to the fuel cell stack 10, an oxygen-containing gas supply unit 114 for supplying an oxygen-containing gas to the fuel cell stack 10, a cooling liquid supply unit 116 for supplying a cooling liquid to the fuel cell stack 10, and a cooling air supply unit 118 for supplying a cooling air to the fuel cell stack 10.

The fuel gas supply unit 112 has a high pressure hydrogen storage source 120. A first pressure reducing valve 124 and a fuel gas flow rate controller 126 are connected to a fuel gas pipe 122 between the high pressure hydrogen storage source 120 and the fuel gas supply passage 36a.

The oxygen-containing gas supply unit 114 has a first compressor 128. A second pressure reducing valve 131 and an oxygen-containing gas flow rate controller 132 are connected to an oxygen-containing gas pipe 130 between the first compressor 128 and the oxygen-containing gas supply passage 38a.

The cooling liquid supply unit 116 has a cooling liquid pipe 134 for connection between the cooling liquid supply passage 46a and the cooling liquid discharge passage 48a. A circulator pump 136 and a relatively compact heat exchanger 138 are connected to the cooling liquid pipe 134.

The cooling air supply unit 118 has a second compressor 140. A third pressure reducing valve 144 and a cooling air flow rate controller 146 are connected to a cooling air pipe 142 between the second compressor 140 and the second cooling cells 20 of the fuel cell stack 10.

An operation of the fuel cell stack 10 in the fuel cell system 110 will be described below.

In the fuel cell system 110, the fuel gas supply unit 112 and the oxygen-containing gas supply unit 114 are controlled based on an electric current required for the load 22 such as a motor. The fuel gas supply unit 112 supplies a predetermined amount of a fuel gas such as a hydrogen gas or hydrogen-containing gas from the high pressure hydrogen storage source 120 to the fuel cell stack 10 through the first pressure reducing valve 124 and the fuel gas flow rate controller 126.

In the oxygen-containing gas supply unit 114, the flow rate of the oxygen-containing gas supplied through the first compressor 128 is controlled by the second pressure reducing valve 131 and the oxygen-containing gas flow rate controller 132. Therefore, a predetermined amount of the oxygen-containing gas is supplied to the fuel cell stack 10.

As shown in FIG. 2, the fuel gas is supplied to the fuel gas inlet port 100a of the end plate 21a. Then, the fuel gas is supplied to the fuel gas flow passage 51 formed on the second separator 34 through the fuel gas supply passage 36a. The hydrogen gas in the fuel gas supplied to the anode 28 of the power generation cell 12 is partially consumed. Then, the fuel gas is discharged into the fuel gas discharge passage 36b.

The air is supplied to the oxygen-containing gas inlet port 102a of the end plate 21a. Then, the air is supplied to the oxygen-containing gas flow passage 50 formed in the first separator 32 through the oxygen-containing gas supply passage 38a. The oxygen in the air supplied to the cathode 26 is partially consumed. Then, the air is discharged into the oxygen-containing gas discharge passage 38b. In this manner, electricity is generated in the power generation cell 12, and the electricity is supplied to the load 22 such as a motor (see FIG. 1).

When power generation is performed in the fuel cell stack 10 as described above, heat is produced to raise the temperature of the power generation cells 12. When electrolyte formed by impregnating polybenzimidazole (PBI) membrane with phosphoric acid is used, the optimum temperature of the power generation cells 12 is not greater than 160° C. Therefore, the pump 136 of the cooling liquid supply unit 116 is used in the fuel cell system 110 as shown in FIG. 6.

The pump 136 is operated to supply the cooling liquid to the cooling liquid supply passage 46a of the fuel cell stack 10. The cooling liquid is supplied into the cooling liquid passage 54 formed between the passage plate 52 and the cover plate 56 of the first cooling cell 18. As shown in FIG. 4, the cooling liquid is supplied from the connector 62a to the grooves 64 on the passage plate 52. The cooling liquid flowing through the grooves 64 cools the power generation surface of the power generation cell 12, and is discharged into the cooling liquid discharge passage 48a.

The cooling liquid flowing through the cooling liquid discharge passage 48a into the cooling liquid pipe has a relatively high temperature due to the heat exchange in the power generation cells 12. Thus, the cooling liquid is supplied to the heat exchanger 138. In the heat exchanger 138, the heat of the cooling liquid is radiated for cooling the cooling liquid. After the temperature of the cooling liquid is decreased, the cooling liquid circulates into the first cooling cells 18 again.

In the first cooling cell 18, the passage plate 52 having the cooling liquid passage 54 and the cover plate 56 are covered by the conductive plates 60a, 60b, and the conductive plates 60a, 60b are insulated by the insulator sheets 58a, 58b (see FIG. 3). Therefore, the cooling liquid passage 54 is electrically insulated form the power generation cell 12, and the electricity generated in the power generation cell 12 does not leak to the cooling liquid flowing in the cooling liquid passage 54. Energy losses caused by electricity leakages to the earth or liquid are reliably prevented, and the desirable power generation performance of the overall fuel cell stack is maintained.

Even if the cooling liquid has some conductivity, the power generation performance of the power generation cells 12 is not affected. Therefore, a conventional coolant such as water including ions or metal additives can be used in the cooling system, and the overall system is simplified and economical.

When the fuel cell stack 10 is operated at a high output for supplying electricity to a high load, a large amount of heat is generated in the power generation cells 12. If the cooling liquid and the compact heat exchanger 138, i.e., the first cooling cells 18 are not sufficient enough to cool all the power generation cells 12 for preventing the maximum temperature of the power generation cells 12 from exceeding the optimum operating temperature, the coolant air supply unit 118 is operated to supply a cooling air to the second cooling cells 20 (see FIG. 6). In the cooling air supply unit 118, the flow rate of the cooling air supplied from the second compressor 140 is controlled by the third pressure reducing valve 144 and the cooling air flow rate controller 146. Then, the cooling air is supplied to the air inlet port 94 from the pipes 96 of the second cooling cells 20.

As shown in FIGS. 3 and 5, the cooling air flows from the air inlet port 94 to the air inlet 90 through the chamber 92. The air inlet 90 is connected to the cooling air passage 82 through the guide 88. The cooling air is supplied to the grooves 86 equally and smoothly through the guide 88. The cooling air flows upwardly through the grooves 86 to cool the power generation cells 12 near the second cooling cell 20.

In the first embodiment, the second cooling cells 20 are disposed centrally between the adjacent first cooling cells 18, centrally between the first cooling cell 18 and the terminal plate 14, and centrally between the first cooling cell 18 and the terminal plate 16 (see FIG. 1). Therefore, five power generation cells are disposed on either side of the second cooling cell 20. The second cooling cells 20 are interposed between the adjacent first cooling cells 18, between the first cooling cell 18 and the terminal plate 14, and between the first cooling cell 18 and the terminal plate 16, at positions of a high temperature. Thus, the power generation cells 12 having the high temperature are cooled effectively.

The power generation cells 12 near the first cooling cells 18 are cooled by the first cooling cells 18 to have a temperature at around the optimum operating temperature, and the power generation cells 12 near the second cooling cell 20 are cooled by the second cooling cell 20 to have a temperature at around the optimum operating temperature. Therefore, all of the power generation cells 12 are controlled at around the optimum operating temperature, and the temperature difference between the power generation cells 12 stacked in the stacking direction is reduced, and the power generation performance of the power generation cells 12 is effectively improved.

When the fuel cell stack 10 is operated at a high output, both of the first cooling cells 18 and the second cooling cells 20 are used for cooling the power generation cells 12 as necessary. Therefore, the fuel cell stack 10 does not require a large heat exchanger for cooling the power generation cells 12. The heat exchanger 138 of a relatively small size is sufficient for cooling the power generation cells 12.

The second cooling cells 20 use cooling air instead of conductive cooling liquid as used in the first cooling cells 18. Therefore, no insulators are needed for insulating the power generation cells 12 from the cooling air. Thus, the system using the second cooling cells 20 is effectively simplified.

Figure 7:
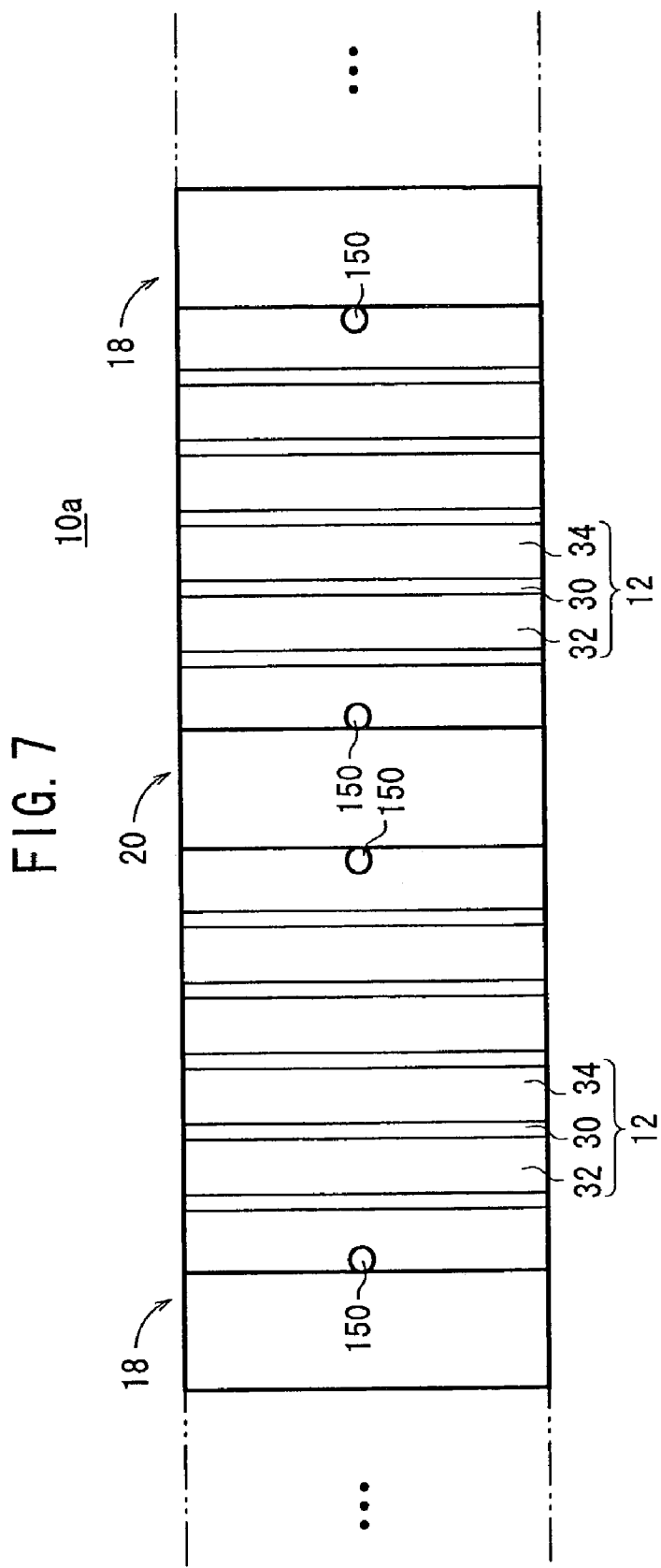
FIG. 7 is a view showing positions of thermocouples for detecting temperature of power generation cells of a fuel cell stack in an example.

As shown in FIG. 7, an experiment was conducted for demonstrating the relationship between the presence of the second cooling cells 20 and the temperature of power generation cells 12 using a fuel cell stack 10a constructed identically to the fuel cell stack 10.

The fuel cell stack 10a was produced by the following process. Thirty power generation cells 12 were stacked together. Then, terminal plates 14, 16 were provided on outermost power generation cells 12 at opposite ends. Epoxy resin plates were provided on the outside of the terminal plates 14, 16 for electric insulation and heat insulation. Further, end plates 21a, 21b having belleville springs and backup plates (not shown) were provided on the outside of the epoxy resin plates. A bolt was inserted between the backup plate of the end plate 21a and the backup plate of the end plate 21b for tightening the components together to form the fuel cell stack 10a.

The number of moles per repeating unit of polybenzimidazole in the polybenzimidazole membrane was calculated beforehand based on the weight of the polybenzimidazole membrane before impregnating with phosphoric acid and the molecular weight in the repeating unit of polybenzimidazole.

Then, the polybenzimidazole membrane having a thickness of 50 $\mu$m was impregnated with phosphoric acid solution of 85% concentration for at least 24 hours until the density of the phosphoric acid in the polybenzimidazole membrane comes to equilibrium. Then, the polybenzimidazole membrane was taken out from the phosphoric acid solution, and vacuum-dried at 80° C. The number of moles in phosphoric acid in the polybenzimidazole membrane after the impregnation was calculated based on the weight of the polybenzimidazole membrane and the molecular weight of phosphoric acid.

The number of molecules of phosphoric acid per repeating unit of the polybenzimidazole membrane calculated based on the number of moles in the repeating unit of the polybenzimidazole and the number of moles in phosphoric acid in the repeating unit of the polybenzimidazole membrane was 10.2.

The cathode 26 and the anode 28 were produced by the following process.

A solution was prepared by dispersing carbon particles and fine powder of polytetrafluoroethylene (PTFE) in ethylene glycol. The solution was used for coating a surface of a carbon paper having a thickness of 270 $\mu$m. After drying the carbon paper, ethylene glycol was removed from the carbon paper to form a carbon-PTFE layer.

Porous carbon fine particles supporting platinum alloy catalysts were moistened by pure water, and mixed with ethylene glycol, and stirred. In this manner, a mixed solution of catalyst-supporting ethylene glycol was obtained.

The carbon-PTFE layer formed on a surface of a carbon cloth was coated uniformly using the catalyst-supporting ethylene glycol solution by screen printing. Then, ethylene glycol was removed by drying to form a catalyst layer. In this manner, an electrode having a gas diffusion layer was formed. The thickness of the electrode having the gas diffusion layer after formation of the catalyst layer was 300 $\mu$m. The power generation surface of the cathode 26 and the anode 28 was 26.8 cm$^2$.

Next, a polyamide film having a thickness of 25 $\mu$m was punched out to form a frame member. The frame member was stacked on an outer portion of an electrolyte layer having substantially same dimensions with the cathode 26 and the anode 28. Then, the components were pressed together using a presser, and heated to form a single piece of assembly (electrolyte electrode assembly) 30.

The first cooling cells 18 were disposed at intervals of 10 power generation cells 12. The second cooling cells 20 were disposed at intervals of five power generation cells 12 between adjacent first cooling cells 18. In this manner, the second cooling cells 20 were interposed centrally between the first cooling cells 18. FIG. 7 shows ten power generation cells 12 out of thirty power generation cells 12 of the fuel cell stack 10a. Thermocouples 150 were disposed between the first cooling cells 18 and the adjacent power generation cells 12, respectively. Further, the thermocouples 150 were disposed on opposite sides of the second cooling cell 20 at central position of the ten power generation cells 12.

The fuel cell stack 10a was operated in the following condition. A hydrogen gas was supplied at a flow rate 18.07 normal 1/min (the flow rate is normalized to the flow rate at a normal condition, 0° C., 1 atm), at a gas utilization ratio 50%, at a pressure of 201.3 kPa (absolute pressure). An air was supplied at a flow rate of 44.5 normal 1/min, at a gas utilization rate of 50%, at a pressure of 201.3 kPa. The current density of the electric current supplied to a load was 0.5 A/cm$^2$. The electric current of 134A was supplied from the fuel cell stack 10a to the load.

Figure 8:
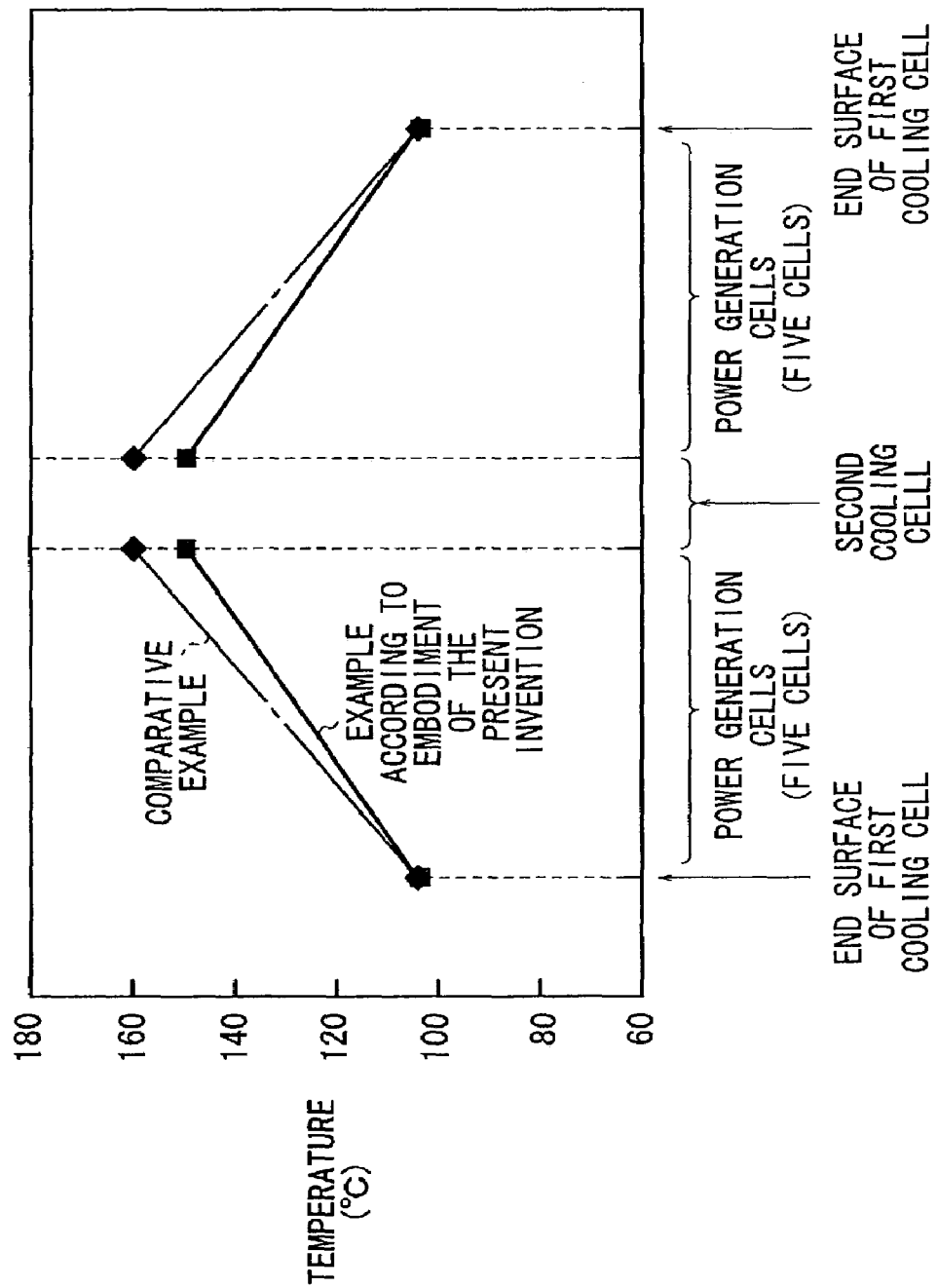
FIG. 8 is a view showing relationship between the presence of air conditioning by the second cooling cell and temperature of the power generation cells using the fuel cell stack shown in FIG. 7.

Firstly, the fuel cell stack 10a was operated without using the second cooling cells 20. A cooling liquid for automobile was supplied to each of the first cooling cells 18 at a flow rate of 2.4 normal 1/min. The temperature distribution of the central ten power generation cells 12 stacked in the stacking direction is shown in FIG. 8 as a comparative example.

Separators for power generation cells 12 in contact with the second cooling cells 20 had the maximum temperature of 160° C. Separators for power generation cells 12 in contact with the first cooling cells 18 had the temperature of 104° C. The optimum temperature for operating the power generation cells 12 is 160° C. Therefore, if the fuel cell stack 10a is operated at a higher output for generating more electricity, the temperature of the power generation cells 12 in contact with the second cooling cells 20 may exceed the optimum operating temperature.

In the first embodiment, the fuel cell stack 10a was operated in the same condition with the comparative example, but an air was supplied to the second cooling cells 20 at a flow rate of 50 normal 1/min after the separators for the power generation cells 12 in contact with the second cooling cells 20 came to the maximum temperature of 160° C. Ten minutes after starting the air supply, the temperature of the separators for the power generation cells 12 in contact with the second cooling cell 20 was decreased to 152° C. (see example according to the embodiment of present invention in FIG. 8).

As described above, the temperature of the components having the highest temperature, i.e., the temperature of the separators for power generation cells 12 in contact with the second cooling cells 20 was 152° C., which was 8° C. lower in comparison with the comparative example. The temperature of the power generation cells 12 in contact with the first cooling cells 18 was 104° C. as same as the comparative example.

With the use of the second cooling cells 20, it is possible to decrease the amount of cooling liquid supplied to the first cooling cells 18 in comparison with the comparative example, and thus, to decrease the amount of the cooling liquid in the fuel cell system 110. Therefore, size of the pump 136 of the cooling liquid supply unit 116 and the size of the heat exchanger 138 are reduced effectively.

In the first embodiment, the first cooling cell 18 and the second cooling cell 20 are stacked at equal intervals in the stacking direction. The positional relationship between the components can be changed suitably as long as the temperature difference between the power generation cells 12 in the stacking direction of the fuel cell stack 10 is small.

Figure 9:
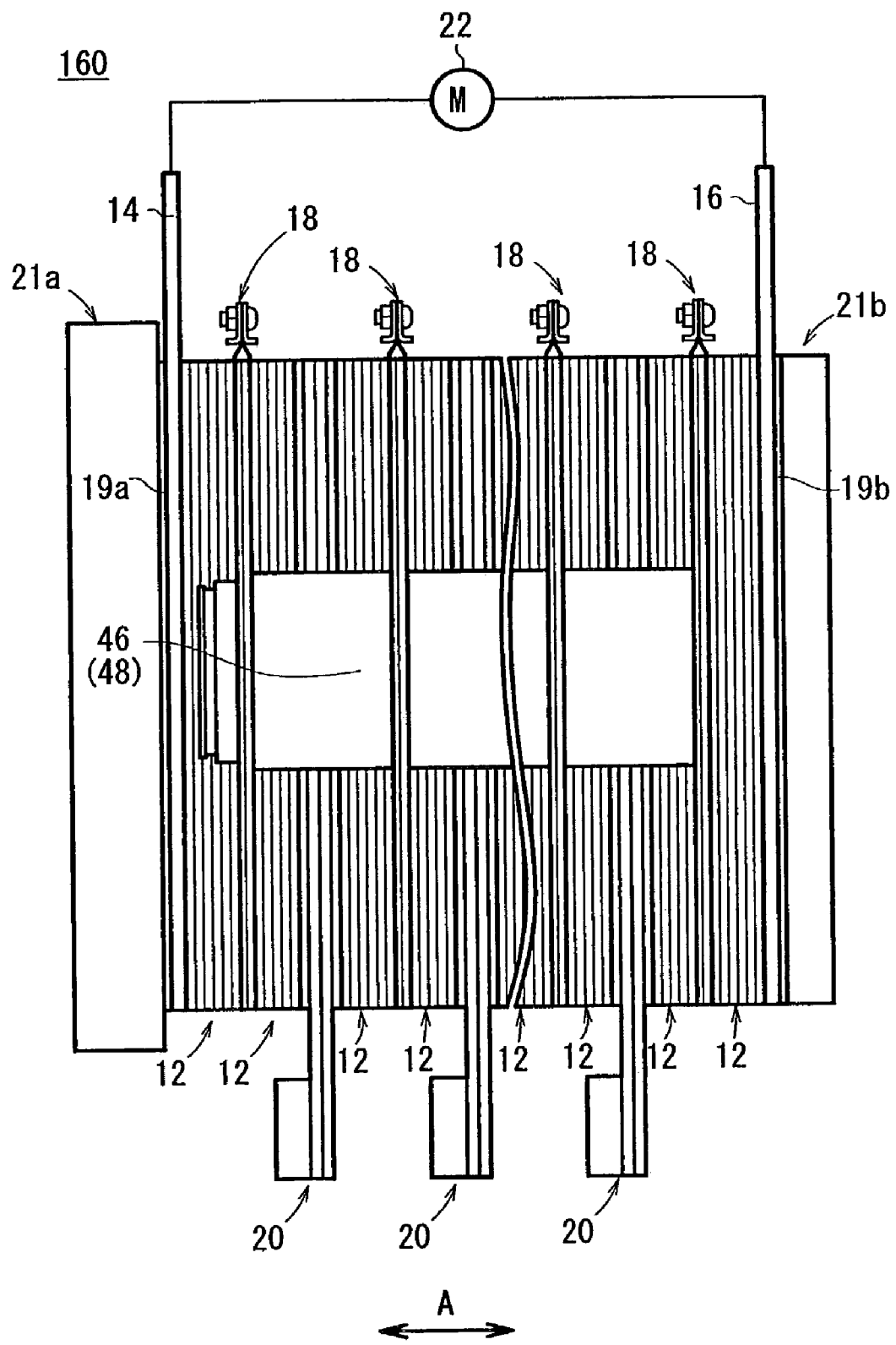
FIG. 9 is a side view schematically showing a fuel cell stack according to a second embodiment of the present invention.

FIG. 9 is a side view schematically showing a fuel cell stack 160 according to a second embodiment of the present invention. In FIG. 9, constituent elements of the fuel cell stack 160 that are identical to those of the fuel cell stack 10 according to the first embodiment are labeled with the same reference numeral, and detailed description thereof is omitted. Further, in third through fifth embodiments described later on, detailed explanation for the identical constituent elements is also omitted.

Figure 10:
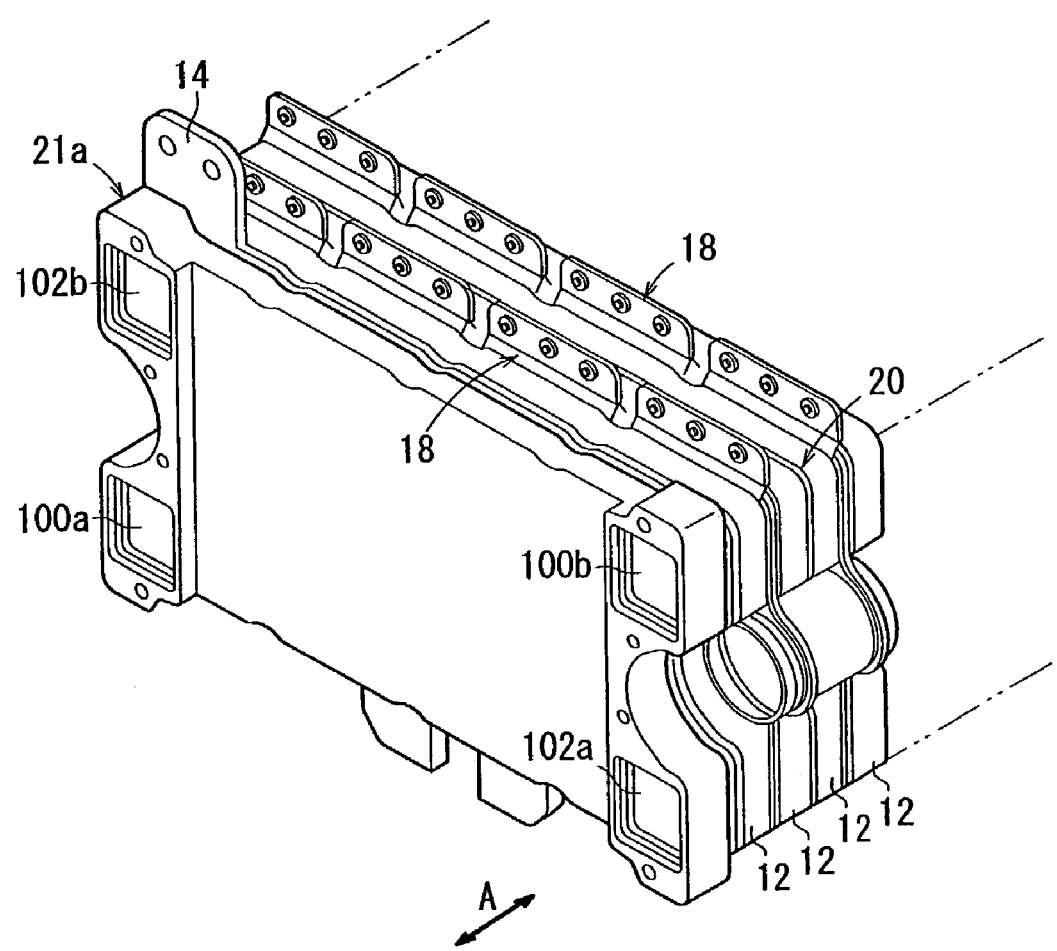
FIG. 10 is a perspective view schematically showing the fuel cells tack.

In the second embodiment, each of second cooling cells 20 is interposed between adjacent first cooling cells 18. Specifically, as shown in FIGS. 9 and 10, the second cooling cell 20 is not interposed between the terminal plate 14 of the fuel cell stack 160 and an outermost first cooling cell 18, and between the terminal plate 16 of the fuel cell stack 160 and the other outermost first cooling cell 18. The second cooling cells 20 are disposed only centrally between the adjacent first cooling cells 18. Ten power generation cells 12 are interposed between the adjacent first cooling cells 18, and the second cooling cell 20 is interposed between the adjacent first cooling cells 18 at intervals of five power generation cells 12. Five power generation cells 12 are interposed between the terminal plate 14 and the first cooling cell 18 adjacent to the terminal plate 14. Likewise, five power generation cells 12 are interposed between the terminal plate 16 and the first cooling cell 18 adjacent to the terminal plate 16.

In the second embodiment, five power generation cells 12 are provided on both sides of the first cooling cells 18. Therefore, the difference in the amount of heat removed (cooled) by the first cooling cells 18 is reduced. Therefore, the temperature difference between the power generation cells 12 in the stacking direction is reduced effectively.

No second cooling cells 20 are interposed between the terminal plate 14 and the first cooling cell 18, and between the terminal plate 16 and the first cooling cell 18. Since the fuel cell stack 160 does not use the second cooling cells 20 at opposite ends, the number of the second cooling cells 20 is reduced by two, for example.

Figure 11:
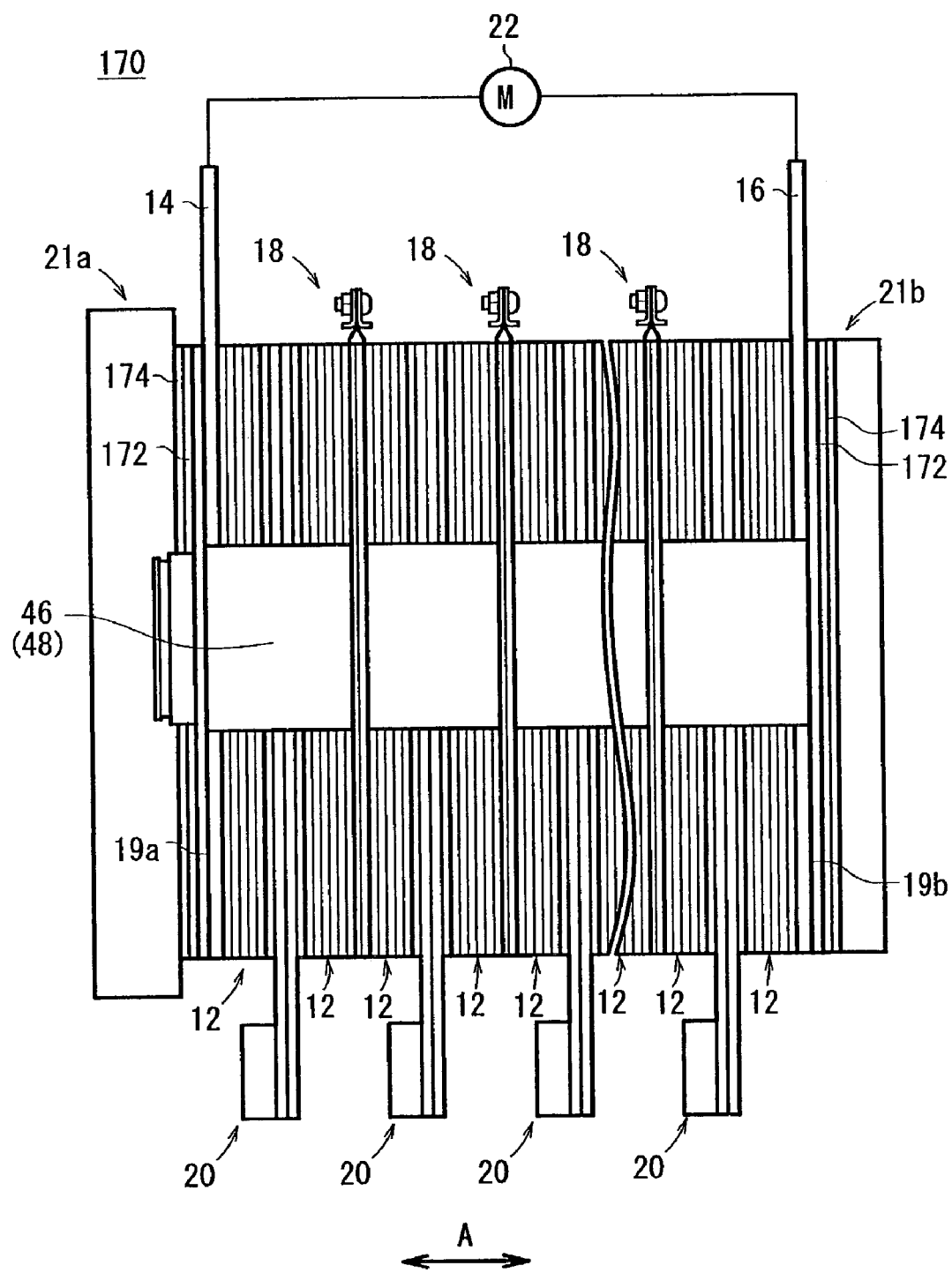
FIG. 11 is a side view schematically showing a fuel cell stack according to a third embodiment of the present invention.

FIG. 11 is a side view schematically showing a fuel cell stack 170 according to a third embodiment of the present invention.

In the fuel cells stack 170, third cooling cells 172 are provided outside the terminal plates 14, 16 oppositely to power generation cells 12. Specifically, insulator sheets 19a, 19b are provided on the terminal plates 14, 16, and the third cooling cells 172 are disposed on the insulator sheets 19a, 19b. Thermal insulators 174 are disposed on the third cooling cells 172, and end plates 21a, 21b are disposed on the thermal insulators 174.

Figure 12:
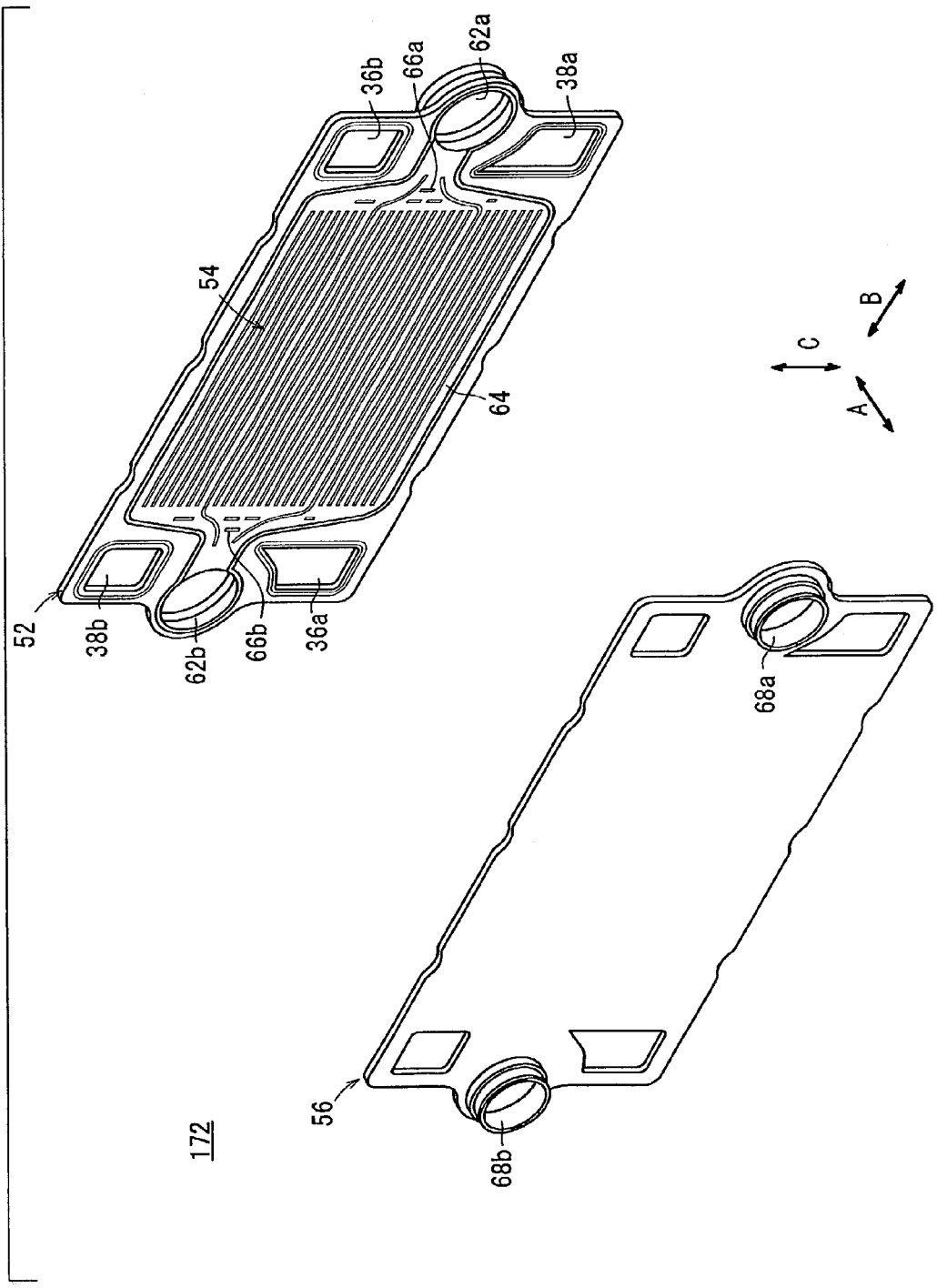
FIG. 12 is an exploded perspective view showing a third cooling cell of the fuel cell stack according to the third embodiment of the present invention.

The third cooling cells 172 are insulated from the terminal plates 14, 16 by the insulator sheets 19a, 19b. Since the third cooling cells 172 do not connect the power generation cells 12 electrically, no conductive plates are needed for the third cooling cells 172. As shown in FIG. 12, the third cooling cell 172 has a passage plate 52 and a cover plate 56.

In the third embodiment, the third cooling cells 172 are provided outside the terminal plates 14, 16. Therefore, the power generation cells 12 near the terminal plates 14, 16 are not cooled excessively, but the third cooling cells 172 are cooled suitably.

Thus, the temperature difference between the power generation cells 12 in the fuel cell stack 170 is reduced. The third cooling cell 172 is formed simply by the passage plate 52 and the cover plate 56. Therefore, the third cooling cell 172 can be produced economically.

Figure 13:
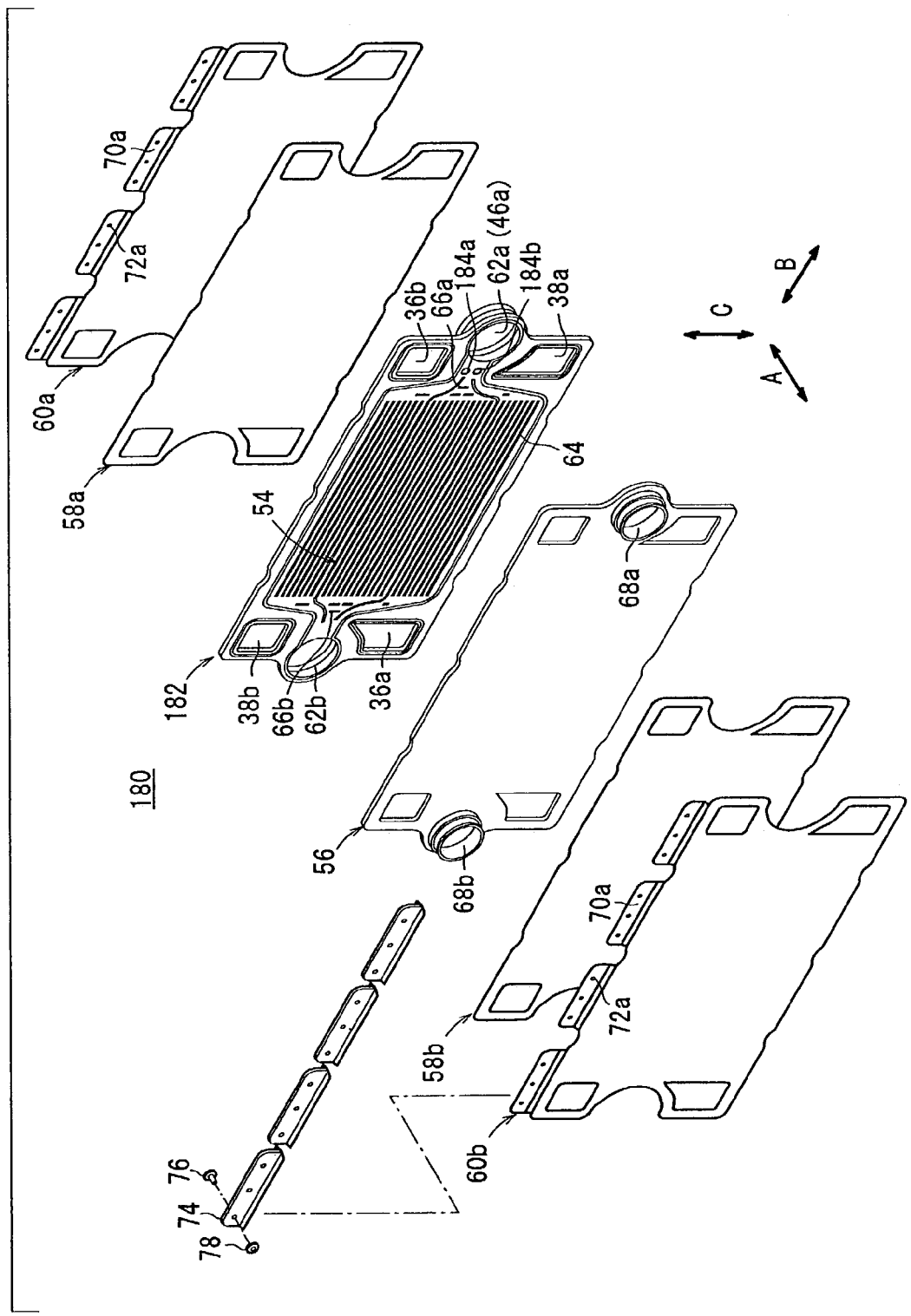
FIG. 13 is an exploded perspective view showing a first cooling cell of a fuel cell stack according to a fourth embodiment of the present invention.

FIG. 13 is an exploded perspective view schematically showing a first cooling cell 180 according to a fourth embodiment of the present invention.

Flow restrictions 184a, 184b are formed on a passage plate 182 of the first cooling cell 180, near an inlet of a cooling liquid passage 54. The flow restrictions 184a, 184b limit the amount of cooling liquid supplied into the cooling liquid passage 54. The flow restrictions 184a, 184b are positioned upstream the guide 66a, and expand from a surface of the passage plate 182.

In the fourth embodiment, the amount of liquid supplied from the cooling liquid supply passage 46a into the cooling liquid passage 54 formed between the passage plate 182 and the cover plate 56 is limited by the flow restrictions 184a, 184b. Therefore, the first cooling cells 180 cool the power generation cells 12 uniformly. In particular, the difference between the temperature of power generation cells 12 near the terminal plates 14, 16 and the temperature of the other power generation cells 12 is effectively reduced.

Figure 14:
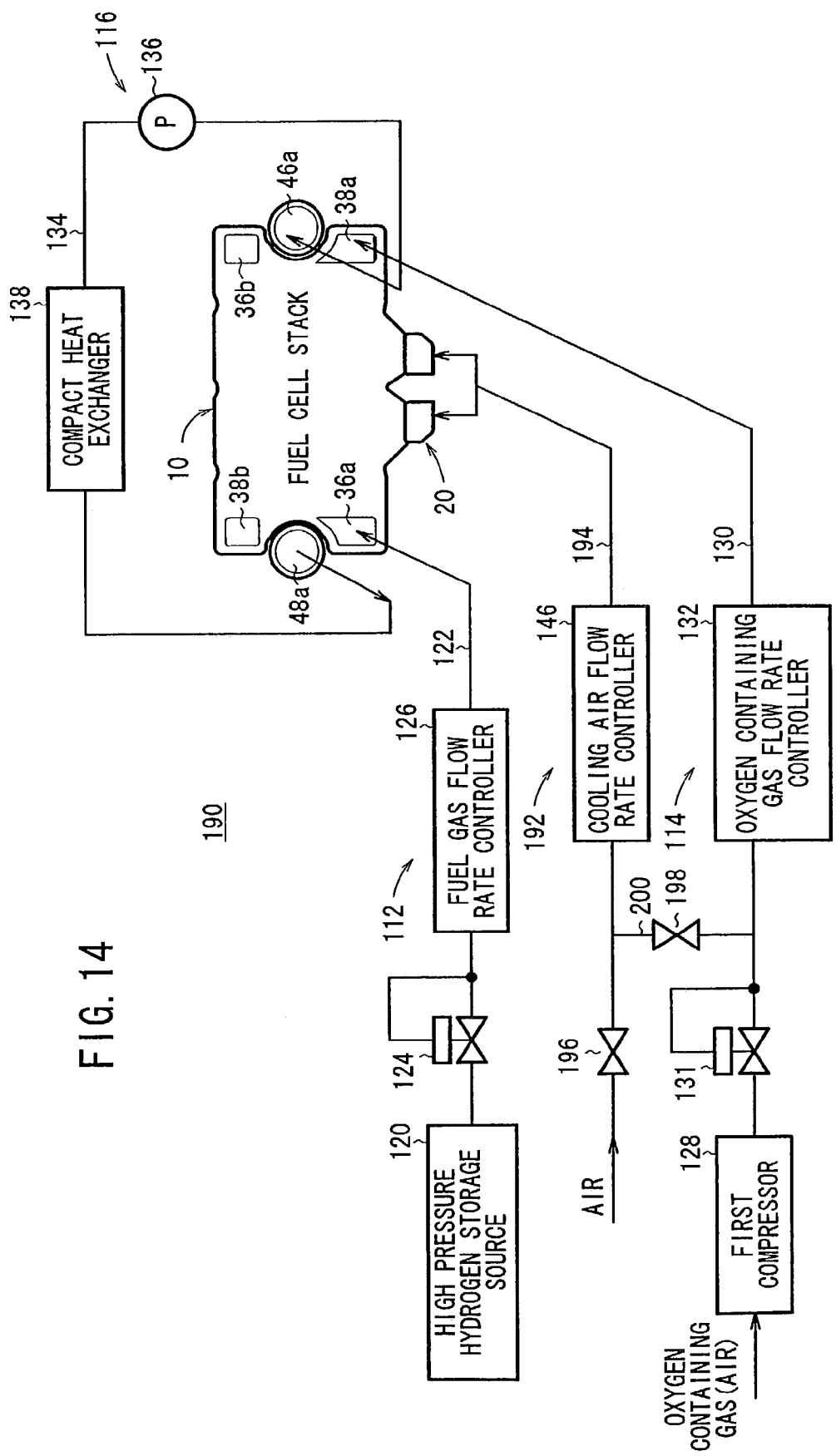
FIG. 14 is a view schematically showing a fuel cell system according to a fifth embodiment of the present invention.

FIG. 14 is a view schematically showing a fuel cell system 190 according to a fifth embodiment of the present invention.

The fuel cell system 190 is mounted on a vehicle. The fuel cell system 190 includes a coolant air supply unit 192 which utilizes a relative wind while the vehicle is moving. The coolant air supply unit 192 includes a cooling air pipe 194 for receiving the relative wind. A flow restriction 196 is provided in the cooling air pipe 194. The cooling air pipe 194 is connected to an oxygen-containing gas pipe 130 by a bypass pipe 200 having a flow restriction 198.

In the fifth embodiment, the relative wind is supplied to the cooling air supply unit 192 while the vehicle is moving. Then, the cooling air flows into second cooling cells 20 of the fuel cell stack 10. In particular, when the fuel cell stack 10 is operated at a high output, the vehicle moves at a high speed, and the amount of the cooling air supplied to the cooling air supply unit 192 is increased. Therefore, the efficiency for cooling the power generation cells 12 is improved. Thus, no auxiliary equipment such as a compressor for supplying the cooling air to the second cooling cells 20 is needed, and the cooling system is compact. Accordingly, the layout of the vehicle can be designed freely. It is possible to make the vehicle compact, and a large space is available in the vehicle.

When the vehicle is moving at a low speed, or when the vehicle is stopped, an oxygen-containing gas such as an air supplied from a first compressor 128 is used as the cooling air. The cooling air flows from the first compressor 128 into the cooling air pipe 194 through the bypass pipe 200, and the cooling air is supplied to the second cooling cells 20.

In the fuel cell stack according to the present invention, first cooling cells and second cooling cells are provided between terminal plates. The second cooling cells are interposed between adjacent first cooling cells, and a predetermined number of power generation cells are interposed between the first cooling cell and the second cooling cell. Therefore, power generation cells having a high temperature between the first cooling cells can be cooled by the second cooling cells. The temperature of the power generation cells near the first cooling cells is controlled approximately at an optimum operating temperature, and the power generation cells near the second cooling cells are cooled to have the optimum operating temperature. Therefore, the temperature of all the power generation cells is controlled approximately at the optimum operating temperature. Thus, the temperature difference between the power generation cells stacked in the stacking direction is reduced, and it is possible to improve power generation performance of the power generation cells.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell stack comprising:
   a plurality of power generation cells each having an assembly and separators, said assembly interposed between said separators and including an anode, a cathode and an electrolyte interposed between said anode and said cathode;
   a pair of terminal plates electrically connected to said power generation cells;
   at least one first cooling cell having an insulator, said first cooling cell interposed between said terminal plates; and
   at least one second cooling cell interposed between said terminal plates, wherein
   a fuel gas is supplied to said anode;
   an oxygen-containing gas is supplied to said cathode;
   a cooling liquid for cooling said power generation cells is supplied to said first cooling cell;
   a cooling gas for cooling said power generation cells is supplied to said second cooling cell; and a predetermined number of said power generation cells are interposed between said first cooling cell and said second cooling cell.

2. A fuel cell stack according to claim 1, wherein a number of said power generation cells interposed between said first cooling cell and said second cooling cell, and a number of said power generation cells interposed between said second cooling cell and said terminal plate are the same.

3. A fuel cell stack according to claim 1, wherein said second cooling cell is interposed between adjacent first cooling cells only.

4. A fuel cell stack according to claim 1, wherein said second cooling cell includes a passage plate and a cover plate stacked on said passage plate to form a cooling gas passage.

5. A fuel cell stack according to claim 4, wherein said cooling gas passage is formed on a surface of said passage plate, and includes a plurality of grooves extending vertically linearly for allowing said cooling gas to flow vertically upwardly.

6. A fuel cell according to claim 5, wherein a gas inlet is connected to a lower portion of said grooves through a guide for equally supplying said cooling gas to said grooves through said guide.

7. A fuel cell stack according to claim 1, wherein third cooling cells are provided outside said terminal plates oppositely to said power generation cells, and a coolant for cooling said power generation cells is supplied to said third cooling cells.

8. A fuel cell stack according to claim 1, wherein said fuel cell stack is mounted on a vehicle, and further comprises a cooling gas supply unit for supplying said cooling gas to said second cooling cell.

9. A fuel cell stack according to claim 8, wherein said cooling gas supply unit utilizes a relative wind while said vehicle is moving for supplying said cooling gas to said second cooling cells.

* * * * *